Patented July 21, 1931

1,815,201

UNITED STATES PATENT OFFICE

AUGUST HARTMANN, OF BARMEN, GERMANY, ASSIGNOR TO THE FIRM AMERICAN BEMBERG CORPORATION, OF NEW YORK, N. Y.

PROCESSES FOR OBTAINING COPPER SULPHATE FROM THE WASTE LIQUORS IN THE PRODUCTION OF CUPRAMMONIUM SILK

No Drawing. Application filed May 24, 1928, Serial No. 280,392, and in Germany May 31, 1927.

This invention relates to an improved process for obtaining copper sulphate in a form suitable for use in the production of cuprammonium silk from waste liquors containing copper and which are obtained in the manufacture of cuprammonium silk. It is known that these waste liquors contain substances of an organic nature, although their chemical composition has not been determined. These waste liquors also contain copper combined with other substances present in the liquor, which substances differ to some extent depending upon whether the waste liquor is from the acidifying of the threads or is waste precipitating liquid from the spinning funnel. For instance it may be present as copper sulphate or copper hydroxide in colloidal form or in the form of complex copper-ammonium salts. Such liquors also contain ammonia and may contain free acid such as sulphuric acid and inorganic salts, for instance sodium sulphate which is formed from the soda-lye contained in the cellulose solution and the sulphuric acid added during the acidifying of the threads.

These substances cause considerable difficulty when it is desired to separate out the copper content of the waste liquors in the form of pure copper salt owing to the fact that when the copper content is separated out, the organic substances also separate out with the copper in spite of repeated separation processes. It has, therefore, hitherto been necessary to separate out the copper content in the form of metallic copper by a cementation process and then to ignite the copper thus obtained in order to decompose the organic substances and then finally to convert the copper into a copper salt. The present invention has for its principal object to provide a relatively simple process for separating out the copper from the original material and in which the organic substances are rendered harmless.

According to the present invention, the waste liquor or the precipitate obtained therefrom is heated to a temperature above 100° C. with an amount of sulphuric acid in excess of that required to convert the copper content in the liquor or precipitate into copper sulphate. If the waste liquor already contains sulphuric acid in the requisite amount, then there is no need to add excess of the acid. It has been found in actual practice that the most suitable temperature to which the material may be heated is from 130° C.–140° C. The organic substances are thus converted into carbon, and the crude copper sulphate, contaminated with carbon, crystallizes. The further treatment is carried out in such a manner that the contaminated crystallized copper sulphate is separated from the excess acid, dissolved in water, filtered to remove the carbon, and is further worked up into pure copper sulphate. The copper sulphate thus recovered is sufficiently pure to be used again in the production of spinning solutions.

Two examples of methods of carrying out the invention will now be described.

*Example 1*

3,000 kilograms of a precipitate obtained from the waste liquor and having a copper content of 4 per cent are mixed with 400 litres of sulphuric acid of 60° Bé. and evaporated by heating up to 140° C. At this temperature copper sulphate is little soluble in sulphuric acid and crude copper sulphate crystallizes out from the evaporated solution. After the organic impurities have carbonized, the excess of sulphuric acid is withdrawn, leaving 380 kilograms of crude copper sulphate having a copper content of 30 per cent. This is dissolved in water, the traces of free acid still present are neutralized, by adding a basic solution such as sodium or potassium carbonate or copper hydroxide, and the impurities are then filtered off. After evaporation 440 kilograms of pure copper sulphate with 5 molecules of water of crystallization are obtained.

*Example 2*

2,000 litres of acid waste liquor containing copper and having a content of 0,7 per cent of copper and 6 per cent of free sulphuric acid are evaporated by heating up to 130° C. The organic impurities carbonize and 45 kilograms of crude copper sulphate containing 29 per cent of copper separate out; 400 litres of waste acid with an inconsiderable copper content are withdrawn, and if desirable this waste acid may be employed for dissolving precipitates containing copper as mentioned in the beginning of Example 1. The crude copper sulphate is purified in a similar manner to that in Example 1, and 51 kilograms of pure copper sulphate having 5 molecules of water of crystallization are obtained.

I claim:—

1. A process for the treatment of waste materials containing copper, such as those resulting during the production of cuprammonium silk, comprising adding sulphuric acid to the waste material in excess of that required to convert the copper to copper sulphate, heating the resulting mixture and then separating the crude crystallized copper sulphate from the mother liquor obtained.

2. A process for the treatment of waste materials containing copper, such as those resulting during the production of cuprammonium silk, comprising adding sulphuric acid to the waste material in excess of that required to convert the copper into copper sulphate, heating the resulting mixture until organic substances present in the material are carbonized and then separating the carbonized products from the copper sulphate formed.

3. A process for the treatment of waste materials containing copper, such as those resulting during the production of cuprammonium silk, comprising adding sulphuric acid to the waste material in excess of that required to convert the copper into copper sulphate, heating the resulting mixture until organic substances present in the material are carbonized, separating the copper sulphate from the carbonized products, and then crystallizing out the copper sulphate formed.

4. A process for the treatment of waste materials containing copper, such as those resulting during the production of cuprammonium silk, consisting in adding sulphuric acid to the waste materials in excess of that required to convert the copper into copper sulphate, heating the resulting mixture until crude copper sulphate contaminated with carbonized organic substances separates out and then separating this contaminated crude copper sulphate into pure copper sulphate and the carbonized products.

5. A process for the treatment of waste materials containing copper, such as those resulting during the production of cuprammonium silk, consisting in adding sulphuric acid to the waste materials in excess of that required to convert the copper into copper sulphate, heating the mixture to a temperature of 130°–140° C., separating the crude crystallized copper sulphate contaminated with carbonized organic substances from the mother liquor and then separating this contaminated crude copper sulphate into pure copper sulphate and the carbonized products.

6. A process for the treatment of acid waste liquors containing copper such as those resulting during the production of cuprammonium silk and containing sulphuric acid in excess of that required to convert the copper to copper sulphate, comprising heating the liquor and then separating out the crude crystallized copper sulphate from the mother liquor obtained.

7. A process for the treatment of acid waste liquors containing copper such as those resulting during the production of cuprammonium silk and containing sulphuric acid in excess of that required to convert the copper into copper sulphate, comprising heating the liquor and carbonizing the organic substances present therein and then separating the carbonized products from the crude copper sulphate formed.

8. A process for the treatment of acid waste liquors containing copper such as those resulting during the production of cuprammonium silk and containing sulphuric acid in excess of that required to convert the copper into copper sulphate comprising heating the liquor until crude copper sulphate contaminated with carbonized organic substances separates and then separating this contaminated crude copper sulphate into pure copper sulphate and the carbonized products.

9. A process for the treatment of acid waste liquors containing copper such as those resulting during the production of cuprammonium silk and containing sulphuric acid in excess of that required to convert the copper into copper sulphate, comprising heating the liquor up to a temperature of 130°–140° C., separating the crude crystallized copper sulphate contaminated with carbonized organic substances from the mother liquor and then separating this contaminated crude copper sulphate into pure copper sulphate and the carbonized products.

10. A process for the treatment of waste materials containing copper, such as those resulting during the production of cuprammonium silk, comprising heating the waste materials in the presence of sulphuric acid in excess of that required to convert the copper to copper sulphate and separating the crude crystallized copper sulphate from the mother liquor obtained.

11. A process for the treatment of waste materials containing copper, such as those resulting during the production of cuprammonium silk, comprising heating the waste materials to a temperature above 100° C. in the presence of sulphuric acid in excess of that required to convert the copper to copper sulphate and then separating the crude crystallized copper sulphate from the mother liquor obtained.

In testimony whereof, I have signed my name to this specification this 9th day of May, 1928.

AUGUST HARTMANN.